United States Patent
Zuccarelli et al.

(10) Patent No.: US 7,117,894 B2
(45) Date of Patent: Oct. 10, 2006

(54) BALL VALVE WITH HIGH DAMPING OF THE NOISE DUE TO FLUID PASSAGE

(75) Inventors: Dino Zuccarelli, Viguzzolo (IT); Antonello Vago, Cermenate (IT)

(73) Assignee: Pibiviesse S.p.A., Nerviano (IT)

( * ) Notice: Subject to any disclaimer, the term of this patent is extended or adjusted under 35 U.S.C. 154(b) by 0 days.

(21) Appl. No.: 11/001,089

(22) Filed: Dec. 2, 2004

(65) Prior Publication Data
US 2005/0126647 A1   Jun. 16, 2005

(30) Foreign Application Priority Data
Dec. 15, 2003   (IT)   ............................. MI03A2454

(51) Int. Cl.
*F16K 47/04*   (2006.01)
(52) U.S. Cl. .................... 137/625.32; 138/42
(58) Field of Classification Search .......... 137/625.31, 137/625.32; 138/42
See application file for complete search history.

(56) References Cited

U.S. PATENT DOCUMENTS

| | | | | |
|---|---|---|---|---|
| 4,102,357 A | * | 7/1978 | Charlton ................. | 137/625.32 |
| 4,429,714 A | * | 2/1984 | Hughes et al. ........... | 137/625.3 |
| 4,530,375 A | * | 7/1985 | Bey ....................... | 137/625.32 |
| 4,805,656 A | * | 2/1989 | Cole et al. ............... | 138/41 |
| 5,070,909 A | * | 12/1991 | Davenport ............. | 137/625.32 |
| 5,937,901 A | * | 8/1999 | Bey ....................... | 137/625.32 |

* cited by examiner

*Primary Examiner*—John Fox
(74) *Attorney, Agent, or Firm*—Jacobson Holman PLLC

(57) ABSTRACT

A regulation ball valve for a fluid flow in which a ball is rotatable to bring a passage thereof from a limit position of full opening of the valve to a limit position of full closure of the valve and vice versa. Present in the passage are perforated baffles that at least at an intermediate position between the limit positions are passed through by a fluid flow. The perforated baffles include two perforated metal sheets between which a layer permeable to the fluid is disposed. In particular the layer can advantageously be formed of chaotically-disposed filaments as in steel wool.

6 Claims, 1 Drawing Sheet

BALL VALVE WITH HIGH DAMPING OF THE NOISE DUE TO FLUID PASSAGE

BACKGROUND OF THE INVENTION

1. Field of the Invention

The present invention relates to a ball valve avoiding the problem of the noise due to passage of the fluid through the ball, above all in the intermediate opening positions of the valve.

2. State of the Prior Art

Known in regulation ball valves (in particular for gas regulation) is the problem of a high production of noise due to the fact that when the valve is in an intermediate position part of the energy of the fluid passing through the ball and the perforated regulation baffles is converted into noise. In the known art attempts have been made to avoid noise propagation by providing the valve with acoustic-insulation protections. This makes the valve bulkier but in any case does not give fully satisfactory results, because the fluid itself co-operates in making the noise travel along the piping and then out of the valve and the acoustic-insulation protections around the valve itself.

It is an aim of the present invention to obviate the above mentioned drawbacks by providing a regulation ball valve avoiding noise being produced by the fluid passing through it, as much as possible.

SUMMARY OF THE INVENTION

In view of the above aim, in accordance with the present invention, a regulation ball valve for a fluid flow has been devised in which a ball is rotatable to bring a passage thereof from a limit position of full opening of the valve to a limit position of full closure of the valve and vice versa, wherein in said passage there is the presence of perforated baffles that at least at an intermediate position between the limit positions are passed through by the fluid flow, the perforated baffles comprising two perforated metal sheets between which a layer permeable to the fluid is disposed.

BRIEF DESCRIPTION OF THE DRAWINGS

For better explaining the innovative principles of the present invention and the advantages it offers over the known art, a possible embodiment applying said principles will be described hereinafter, with the aid of the accompanying drawings. In the drawings.

DETAILED DESCRIPTION OF THE INVENTION

Figure 1:
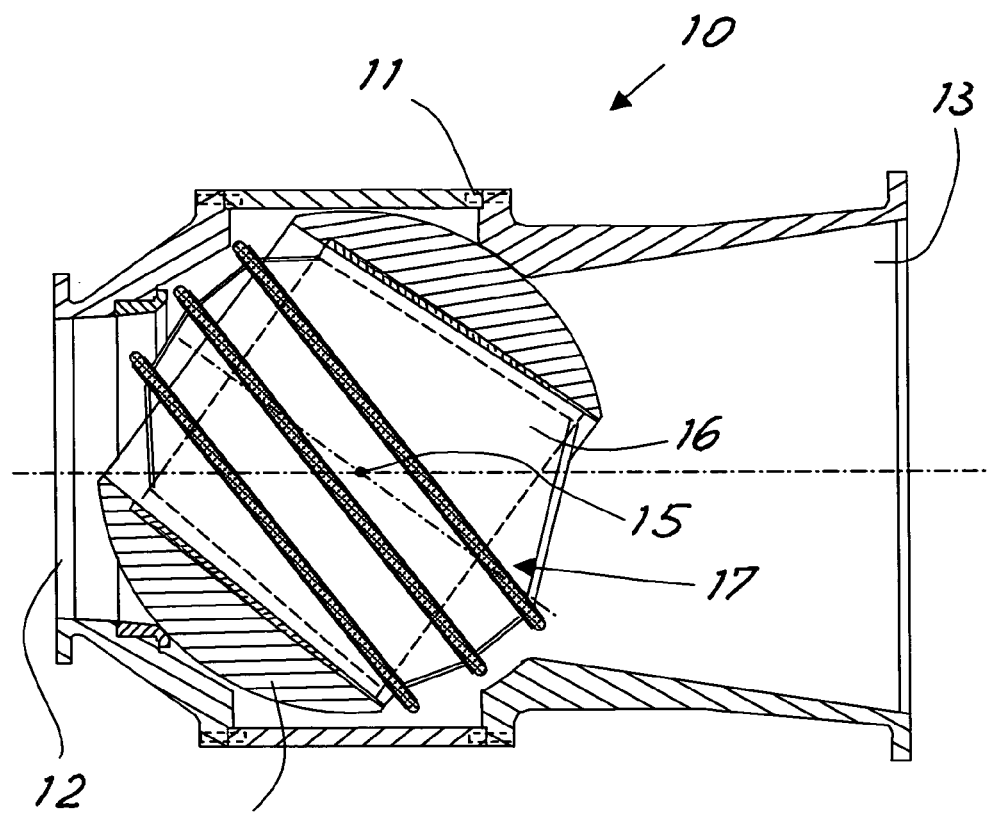
FIG. 1 is a top view in longitudinal section of a valve in accordance with the invention.

With reference to the drawings, shown in FIG. 1 is a ball valve for fluids (in particular gases) applying the principles of the invention and generally denoted at 10. Valve 10 comprises a body 11 provided with coaxial inlet 12 and outlet 13 pipe fittings and with an on-off ball 14 that is sealingly rotatable around an axis 15 to bring a passage 16 thereof from a position (of full opening of the valve) in which the passage is aligned with the inlet and outlet ducts, to a position (of full closure of the valve) in which the passage is disposed transversely of the inlet and outlet ducts.

In FIG. 1 the valve is shown with the ball in an intermediate position between the limit positions.

Figure 2:
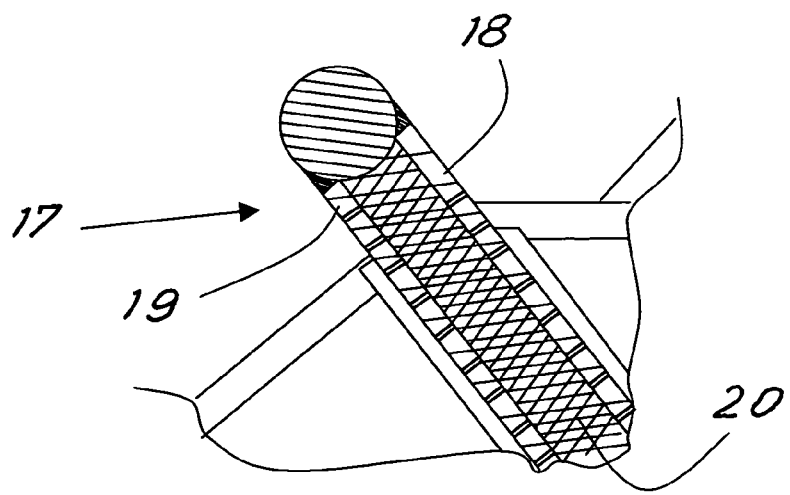
FIG. 2 represents a detail to an enlarged scale of the valve in FIG. 1.

Present within passage 16 are baffles or plates 17 disposed inclined to the passage axis. As better viewed from FIG. 2, the baffles are each formed of two perforated metal sheets 18, 19 between which a layer 20 permeable to the fluid is placed. The layer has such a structure that it enables passage of the fluid through a great plurality of also tortuous passages. In particular, the layer is yielding and sandwiched between the plates.

The material of layer 20 will be such selected as to be suitable for the type of fluid running through the valve. According to a particularly advantageous embodiment, the layer is made up of filaments, in particular chaotically-disposed metallic filaments, having a structure similar to that of steel wool.

As shown in FIG. 1, in addition to being inclined, the opposite ends of the baffles are closed and appear from opposite openings of passage 16. In a fully open position of the valve (and in the vicinity of this position) the free ends of the baffles are such disposed as to face the inlet and outlet pipe fittings of the valve, so that at least the greatest majority of the fluid flow passes through passage 16 lightly touching the outer surface of the baffles and moving in parallel between one baffle and the other instead of crossing them. As the ball is rotated towards the fully closed position, the flow is forced to pass through said baffles. During said passage and by a combined action both of the perforated metal sheets and of the intermediate material, there is a pressure loss in the fluid while part of the energy is absorbed by the intermediate element. It has been found that this enables occurrence of a very high reduction in noise, the damping device acting directly where the noise is created. The intermediate layer is able to produce a pressure gradient without emitting too much noise to the outside.

At this point it is apparent that the intended purposes are achieved, by providing a valve that even if submitted to high flows and with strong regulations produces a satisfactorily reduced noise amount as compared with known regulation valves.

Obviously, the above description of an embodiment applying the innovative principles of the present invention is given by way of example only and therefore must not be considered as a limitation of the scope of the patent rights herein claimed. For example, the conformation of the perforated metal sheets forming the "sandwich", the number and shape of the holes, the thickness and the porous material can vary depending on use and also different can be the characteristics of the generally "porous" or permeable material that is interposed between the metal sheets to help energy dissipation and break the noise down.

What is claimed is:

1. A regulation ball valve for a fluid flow, said regulation ball valve comprising
a body having a passageway therethrough,
a ball located in said passageway being rotatable to bring a passage thereof through the ball from a limit position of full opening of the passageway to a limit position of full closure of the passageway and vice versa, said passage including perforated baffles, said baffles, at least in an intermediate position between the limit positions, being passed through by a fluid flow, the perforated baffles including two perforated metal sheets, and a layer of a material permeable to the fluid being disposed between said two perforated metal sheets.

2. The valve as claimed in claim 1, wherein the layer of the material is a yielding layer.

3. The valve as claimed in claim 1, wherein the layer of the material is formed of chaotically-disposed filaments.

4. The valve as claimed in claim 3, wherein the filaments are of metal material.

5. The valve as claimed in claim 1, wherein the layer of the material consists of steel wool.

6. The valve as claimed in claim 1, wherein the baffles are disposed inclined to an axis of the passage and have opposite ends appearing from opposite openings of the passage for fluid inlet and outlet, and in a vicinity of a frilly open position the fluid passes through the passage lightly touching an outer surface of the baffles and mainly passing between one baffle and another baffle instead of crossing the baffles.

* * * * *